(12) United States Patent
Yamamoto et al.

(10) Patent No.: US 10,684,526 B2
(45) Date of Patent: *Jun. 16, 2020

(54) ELECTROCHROMIC ELEMENT

(71) Applicant: CANON KABUSHIKI KAISHA, Tokyo (JP)

(72) Inventors: Jun Yamamoto, Tokyo (JP); Shinjiro Okada, Kamakura (JP); Kenji Yamada, Yokohama (JP); Wataru Kubo, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 16/159,160

(22) Filed: Oct. 12, 2018

(65) Prior Publication Data
US 2019/0049813 A1 Feb. 14, 2019

Related U.S. Application Data

(63) Continuation of application No. 15/543,734, filed as application No. PCT/JP2016/061186 on Mar. 30, 2016, now Pat. No. 10,151,958.

(30) Foreign Application Priority Data

Apr. 14, 2015 (JP) .................................. 2015-082520

(51) Int. Cl.
*G02F 1/163* (2006.01)
*G02F 1/1503* (2019.01)
(Continued)

(52) U.S. Cl.
CPC ............ *G02F 1/163* (2013.01); *F21V 14/003* (2013.01); *G02B 5/23* (2013.01); *G02F 1/15* (2013.01);
(Continued)

(58) Field of Classification Search
CPC ........ G02F 1/163; G02F 1/1503; G02F 1/153; G02F 1/15; G02F 2001/15145;
(Continued)

(56) References Cited

U.S. PATENT DOCUMENTS 5,179,467 A  1/1993 Buchwalter et al.
6,061,042 A  5/2000 Takahashi et al.
(Continued)

FOREIGN PATENT DOCUMENTS

JP  2001-519922 A  10/2001
WO  98/44384 A1  10/1998
(Continued)

OTHER PUBLICATIONS

International Preliminary Report on Patentability in International Application No. PCT/JP2016/061186 dated (Oct. 2017).
(Continued)

*Primary Examiner* — Tuyen Tra
(74) *Attorney, Agent, or Firm* — Venable LLP

(57) ABSTRACT

An electrochromic element, which includes a pair of electrodes and an electrochromic layer disposed between the electrodes. The electrochromic layer contains at least one of two or more kinds of anode electrochromic materials, or two or more kinds of cathode electrochromic materials. All of one of the anode electrochromic materials and the cathode electrochromic materials have an equal molecular length, or have a molecular length ratio of (large molecular length)/(small molecular length) of 1.4 or less, the electrochromic element being such that even when a driving environment temperature changes, its gradation can be controlled under a state in which its absorption spectrum is retained.

20 Claims, 7 Drawing Sheets

(51) Int. Cl.
*G02B 5/23* (2006.01)
*G02F 1/15* (2019.01)
*F21V 14/00* (2018.01)
*G02F 1/153* (2006.01)
*G09G 3/19* (2006.01)
*G09G 3/38* (2006.01)
*G02F 1/1516* (2019.01)
*G02F 1/1514* (2019.01)
*F21V 9/40* (2018.01)
*G09G 3/16* (2006.01)

(52) U.S. Cl.
CPC ............ *G02F 1/1503* (2019.01); *G02F 1/153* (2013.01); *G09G 3/19* (2013.01); *G09G 3/38* (2013.01); *F21V 9/40* (2018.02); *G02F 1/15165* (2019.01); *G02F 2001/15145* (2019.01); *G02F 2203/21* (2013.01); *G02F 2203/48* (2013.01); *G09G 3/16* (2013.01)

(58) Field of Classification Search
CPC ............. G02F 1/15165; G02F 2203/48; G02F 2203/21; G09G 3/38; G09G 3/19; G09G 3/16; G02B 5/23; F21V 14/003; F21V 9/40
USPC .................................. 359/265–275
See application file for complete search history.

(56) References Cited

U.S. PATENT DOCUMENTS

| | | | |
|---|---|---|---|
| 9,001,408 B2 | 4/2015 | Yamada et al. | |
| 9,395,594 B2 | 7/2016 | Yamamoto et al. | |
| 9,507,233 B2 | 11/2016 | Bergh et al. | |
| 9,606,411 B2 | 3/2017 | Bergh et al. | |
| 9,678,402 B2 | 6/2017 | Yamamoto | |
| 9,798,213 B2 | 10/2017 | Kubo et al. | |
| 9,933,681 B2 | 4/2018 | Yamamoto et al. | |
| 10,151,958 B2 * | 12/2018 | Yamamoto | G02F 1/15 |
| 2012/0314272 A1 | 12/2012 | Yamada et al. | |
| 2014/0362430 A1 | 12/2014 | Yamamoto et al. | |
| 2016/0041447 A1 | 2/2016 | Yamamoto et al. | |
| 2016/0357082 A1 | 12/2016 | Kubo et al. | |
| 2017/0003562 A1 | 1/2017 | Kubo et al. | |
| 2017/0003563 A1 | 1/2017 | Kubo et al. | |
| 2017/0242314 A1 | 8/2017 | Kubo et al. | |
| 2018/0024407 A1 | 1/2018 | Kubo et al. | |
| 2018/0052375 A1 | 2/2018 | Yamada et al. | |

FOREIGN PATENT DOCUMENTS

| | | |
|---|---|---|
| WO | 2016/072526 A1 | 5/2016 |
| WO | 2017/010360 A1 | 1/2017 |

OTHER PUBLICATIONS

International Search Report and Written Opinion in International Application No. PCT/JP2016/061186 dated (Jun. 2016).
Notice of Reasons for Refusal in Japanese Application No. 2016-078659 dated (Mar. 2020).

* cited by examiner

TRANSMITTED LIGHT

ELECTROCHROMIC ELEMENT

CROSS-REFERENCE TO RELATED APPLICATIONS

This application is a continuation application of U.S. patent application Ser. No. 15/543,734, which was the U.S. National Stage of International Application No. PCT/JP2016/061186, filed Mar. 30, 2016, which claims the benefit of Japanese Patent Application No. 2015-082520, filed Apr. 14, 2015. All of these prior applications are hereby incorporated by reference herein in their entirety.

TECHNICAL FIELD

The present invention relates to an electrochromic element.

BACKGROUND ART

An electrochromic (EC) phenomenon is a phenomenon in which a material is colored or decolored through changes in its light absorption region induced by a reversible electrochemical reaction (oxidation reaction or reduction reaction) caused at the time of application of a voltage. An electrochemically coloring/decoloring element utilizing the EC phenomenon is referred to as "electrochromic element (EC element)," and is expected to find applications as a light control element configured to change an optical transmittance. It has been known that an organic EC element, in which a low-molecular weight organic material is colored/decolored in a solution state, has advantages of a sufficient contrast ratio in a colored state, a high transmittance in a decolored state, and the like. In addition, it has been known that the organic EC element has an advantage in that its color state can be arbitrarily controlled by mixing a plurality of materials having different absorption wavelengths. The use of such EC element in an optical filter requires not only arbitrary control (gradation control) of the optical transmittance but also the fact that the wavelength selectivity (absorption spectrum) of light absorption does not largely change.

A voltage modulation method involving changing the magnitude of a drive voltage or a pulse width modulation method involving changing the pulse width (duty ratio) of a voltage application period has been known for controlling the gradation of the EC element. In PTL 1, gradation control is performed in an EC element using a low-molecular weight organic EC material by the voltage modulation method. In the voltage modulation method, when an oxidation-reduction potential difference between anodic materials or between cathodic materials is large, a difference occurs in a reaction amount ratio between the materials owing to a difference in drive voltage to preclude the retention of the shape of an absorption spectrum. In PTL 1, the oxidation-reduction potential difference between the anodic materials or between the cathodic materials is set to 60 mV or less for solving the problem. The change of the absorption spectrum due to the difference in drive voltage is suppressed by uniformizing their oxidation-reduction potentials.

However, when the EC element is driven by the voltage modulation method, an increase in applied voltage involves, for example, the following problems. An electrical load is liable to be applied to an EC material to accelerate its deterioration, and the influences of impurities, such as water and oxygen, on electrical characteristics are liable to be apparent.

Accordingly, the pulse width modulation method is preferred as a driving method. In the pulse width modulation method, a voltage application period, i.e., the period for which an electrochemical reaction is controlled occupying one cycle of a pulse is adjusted by making an applied voltage constant. An excessive electrical load on the EC material and the influences of the impurities on the electrical characteristics observed in the voltage modulation method are suppressed because the driving is performed under a constant voltage. Further, a difference seldom occurs in a reaction amount ratio between materials, and hence even in the case of anodic materials or cathodic materials having different oxidation-reduction potentials, an absorption spectrum can be easily retained against gradation control. As described above, in the EC element, the use of the pulse width modulation method under a constant voltage enables the performance of gradation control in a state in which the absorption spectrum is retained.

However, an EC element having a plurality of anodic materials or a plurality of cathodic materials involves a problem in that its absorption spectrum changes with a driving environment temperature. That is, in the case where the anodic materials or the cathodic materials differ from each other in temperature dependence of an electrochemical reaction, even when the element is driven under a constant voltage, a difference occurs in a reaction amount ratio between the anodic materials or the cathodic materials as the driving environment temperature changes. As a result, the shape of the absorption spectrum cannot be retained.

CITATION LIST

Patent Literature

PTL 1: International Publication No. WO1998/044384

SUMMARY OF INVENTION

Technical Problem

The present invention has been accomplished in view of such background art, and the present invention is directed to providing such an EC element that even when a driving environment temperature changes, its gradation can be controlled in a state in which its absorption spectrum is retained.

Solution to Problem

According to one aspect of the present invention, there is provided an electrochromic element, including:
  a pair of electrodes; and
  an electrochromic layer disposed between the pair of electrodes,
  the electrochromic element being controlled in transmittance by pulse width modulation,
  in which:
  the electrochromic layer contains at least one of
  two or more kinds of anode electrochromic materials, or
  two or more kinds of cathode electrochromic materials; and
  all of one of the anode electrochromic materials and the cathode electrochromic materials have an equal molecular length, or have a molecular length ratio of (large molecular length)/(small molecular length) of 1.4 or less.

Further features of the present invention will become apparent from the following description of exemplary embodiments with reference to the attached drawings.

Advantageous Effects of Invention

According to the present invention, there can be provided an EC element whose absorption spectrum changes to a small extent even when a temperature at the time of its driving changes.

DESCRIPTION OF EMBODIMENTS

Preferred embodiments of the present invention will now be described in detail in accordance with the accompanying drawings.

<<EC Element>>

Figure 1:
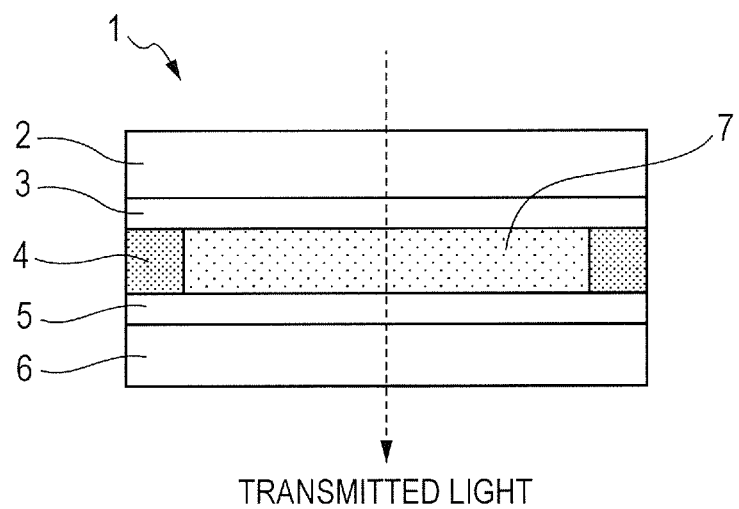
FIG. 1 is a schematic sectional view for illustrating an example of an EC element of the present invention.

FIG. 1 is a schematic sectional view for illustrating an example of an EC element of the present invention. The EC element of FIG. 1 has a configuration in which transparent substrates 2 and 6 having formed thereon transparent electrodes 3 and 5, respectively are bonded to each other through a spacer 4 so that electrode 3 and 5 sides face each other, and an electrochromic layer (EC layer) 7 is present in a space formed by the pair of electrodes 3 and 5 and the spacer 4. The EC layer 7 contains at least one of: two or more kinds of anode electrochromic materials; or two or more kinds of cathode electrochromic materials. The application of a voltage between the electrodes 3 and 5 causes the electrochemical reaction of the EC materials.

In general, the organic EC material is in a neutral state under a state in which a voltage is not applied, and does not show absorption in a visible light region. In such decolored state, the organic EC element exhibits a high optical transmittance. When a voltage is applied between the electrodes, the organic EC material causes an electrochemical reaction to be converted from the neutral state to an oxidized state (cation) or a reduced state (anion). The organic EC material shows absorption in the visible light region in the form of cation or anion, to be colored. In such colored state, the organic EC element exhibits a low optical transmittance. In addition, there also exists a material that forms a transparent dication structure in an initial state and is colored in blue through one-electron reduction, like a viologen, which is a typical organic EC material.

In the following discussion, the optical transmittance of the EC element is replaced with the absorbance of the EC element. The transmittance and the absorbance have a relationship of −log(transmittance)=(absorbance). Every time the transmittance is reduced to ½, the absorbance is increased by about 0.3.

<Substrates 2 and 6>

In the case of using the EC element as a light control element, it is preferred that the EC element keep a high transmittance in a decolored state in order to reduce an influence on an optical system. Therefore, the substrates 2 and 6 are each preferably a transparent substrate configured to sufficiently transmit visible light. A grass material is generally used, and an optical glass substrate, such as Corning #7059 or BK-7, may be preferably used. In addition, even a material such as plastic or ceramic may be appropriately used as long as the material has sufficient transparency. The substrates 2 and 6 are each preferably formed of a rigid material with less distortion. In addition, the substrates each more preferably have less flexibility. In general, the substrates 2 and 6 each have a thickness of from several tens of micrometers to several millimeters.

<Electrodes 3 and 5>

In the case of using the EC element as a light control element, it is preferred that the EC element keep a high transmittance in a decolored state in order to reduce an influence on an optical system. Therefore, the electrodes 3 and 5 are each preferably a transparent electrode configured to sufficiently transmit visible light. The electrodes 3 and 5 are each more preferably formed of a material having a high light transmitting property in a visible light region and high conductivity. Examples of such material may include: metals and metal oxides, such as indium tin oxide alloy (ITO), tin oxide (NESA), indium zinc oxide (IZO), silver oxide, vanadium oxide, molybdenum oxide, gold, silver, platinum, copper, indium, and chromium; silicon-based materials, such as polycrystalline silicon and amorphous silicon; and carbon materials, such as carbon black, graphene, graphite, and glassy carbon. In addition, a conductive polymer having its conductivity improved through, for example, doping treatment (such as polyaniline, polypyrrole, polythiophene, polyacetylene, polyparaphenylene, or a complex of polyethylene dioxythiophene and polystyrene sulfonate (PEDOT: PSS)) may also suitably be used. The EC element of the present invention preferably has a high transmittance in a decolored state, and hence, for example, ITO, IZO, NESA, PEDOT:PSS, or graphene is particularly preferably used. Those materials may be used in various forms such as a bulk form and a fine particle form. It is to be noted that one of those electrode materials may be used alone, or a plurality thereof may be used in combination.

<EC Layer 7>

The EC layer 7 is preferably an EC layer in which an electrolyte and an organic EC material such as a low-molecular weight organic material are dissolved in a solvent.

The solvent is not particularly limited as long as the solvent can dissolve the electrolyte, but a polar solvent is particularly preferred. Specific examples thereof include water as well as organic polar solvents, such as methanol, ethanol, propylene carbonate, ethylene carbonate, dimethyl sulfoxide, dimethoxyethane, acetonitrile, γ-butyrolactone, γ-valerolactone, sulfolane, dimethylformamide, dimethoxyethane, tetrahydrofuran, acetonitrile, propionitrile, dimethylacetamide, methylpyrrolidinone, and dioxolane.

The electrolyte is not particularly limited as long as the electrolyte is an ion dissociative salt exhibiting satisfactory solubility and including a cation or anion having an electron-donating property to the extent that the coloration of the organic EC material can be ensured. Examples thereof include various inorganic ion salts such as alkali metal salts and alkaline earth metal salts, quaternary ammonium salts, and cyclic quaternary ammonium salts. Specific examples thereof include: salts of alkali metals, such as Li, Na, and K, e.g., $LiClO_4$, $LiSCN$, $LiBF_4$, $LiAsF_6$, $LiCF_3SO_3$, $LiPF_6$, LiI, NaI, NaSCN, $NaClO_4$, $NaBF_4$, $NaAsF_6$, KSCN, and KCl; and quaternary ammonium salts and cyclic quaternary ammonium salts, such as $(CH_3)_4NBF_4$, $(C_2H_5)_4NBF_4$, $(n-C_4H_9)_4NBF_4$, $(C_2H_5)_4NBr$, $(C_2H_5)_4NClO_4$, and $(n-C_4H_9)_4\ NClO_4$. In addition, an ionic liquid may also be used. One of those electrolyte materials may be used alone, or a plurality thereof may be used in combination.

Specifically, for example, an organic dye, such as a bipyridine derivative, a styryl derivative, a fluorane derivative, a cyanine derivative, an anthraquinone derivative, or an aromatic amine derivative, or an organometallic complex, such as a metal-bipyridyl complex or a metal-phthalocyanine complex, can be used as the organic EC material. It is to be noted that of the bipyridine derivatives, a viologen-based compound can be used as a cathodic material that is decolored in a stable dication state involving a counter ion and is colored when brought into a cation state by a one-electron reduction reaction.

An anodic EC material that is colored in an oxidized state is, for example, a thiophene derivative, a metallocene derivative, such as ferrocene, an aromatic amine derivative, such as a phenazine derivative, a triphenylamine derivative, a phenothiazine derivative, or a phenoxazine derivative, a pyrrole derivative, or a pyrazoline derivative. However, the anodic EC material to be used in the EC element 1 of this embodiment is not limited thereto.

A cathodic EC material that is colored in a reduced state is, for example, a bipyridine derivative, an anthraquinone derivative, a ferrocenium salt-based compound, or a styryl derivative. The EC element 1 preferably contains, as the cathodic EC material, a viologen derivative out of the bipyridine derivatives out of those materials.

In particular, in order to retain an absorption spectrum against a temperature change, it is preferred that any such material hardly form an association. When the material forms the association, the absorption of a monomer and the absorption of the association are superimposed in the absorption spectrum. The ease with which the association is formed changes with a temperature, and hence in such material, a ratio between the absorption of the monomer and the absorption of the association changes owing to a temperature change. A method involving providing a bulky substituent to suppress the formation of the association by virtue of its steric hindrance is suitably used for avoiding the formation of the association.

The EC layer 7 is preferably a liquid or a gel. The EC layer 7 is suitably used in a solution state, but may also be used in a gel state. Gelling is carried out by further incorporating a polymer or a gelling agent into a solution. Examples of the polymer (gelling agent) include, but not particularly limited to, polyacrylonitrile, carboxymethylcellulose, polyvinyl chloride, polyvinyl bromide, polyethylene oxide, polypropylene oxide, polyurethane, polyacrylate, polymethacrylate, polyamide, polyacrylamide, polyester, polyvinylidene fluoride, and Nafion. Thus, the EC layer 7 may be used in a viscous state, a gel state, or the like.

In addition, the EC layer may be used in a state in which the solution is supported by a structural body having a transparent and flexible network structure (for example, a sponge-like one), other than in the mixed state as described above.

<EC Apparatus and Driving Method>

Figure 2:
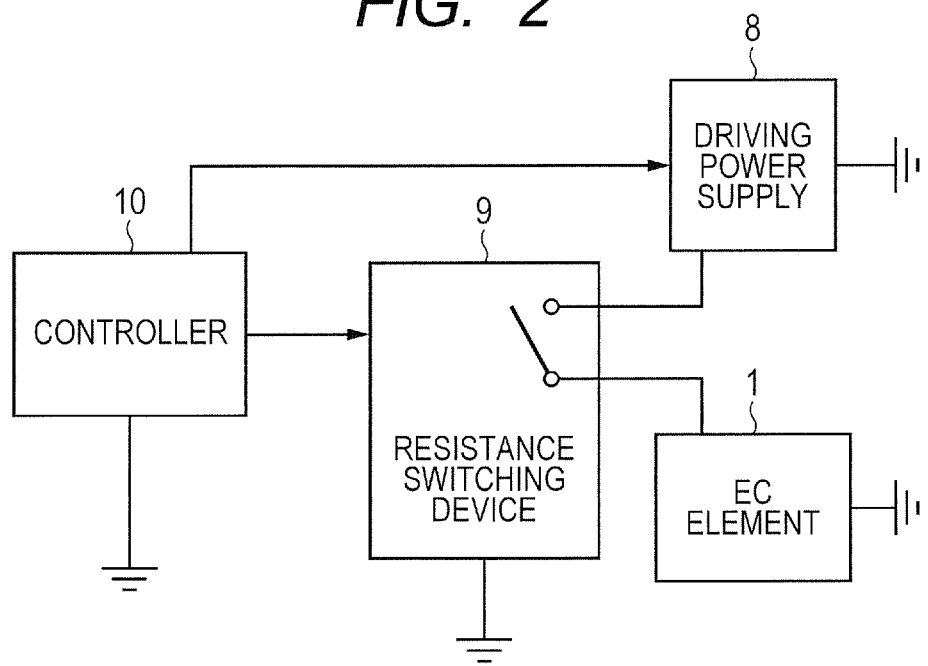
FIG. 2 is a schematic view for illustrating an example of an EC apparatus of the present invention.

FIG. 2 is a schematic view for illustrating an example of an EC apparatus of the present invention. An EC apparatus of FIG. 2 has the EC element 1 and a drive unit configured to drive the EC element 1. In FIG. 2, the drive unit has a driving power supply 8, a resistance switching device 9, and a controller 10. The drive unit is preferably a unit configured to control the transmittance of the EC element 1 by pulse width modulation, and the unit being configured to maintain the transmittance of the EC element without changing the wave height value of a pulse voltage waveform, and to control the transmittance of the EC element by changing the ratio of the application period of an applied voltage to one cycle of the pulse voltage waveform.

The driving power supply 8 applies, to the EC element 1, a voltage (drive voltage V1) required for the EC materials to cause an electrochemical reaction. When the EC layer 7 contains a plurality of kinds of EC materials like the EC element of the present invention, an absorption spectrum may change owing to a difference in oxidation-reduction potential or in molar attenuation coefficient between the EC materials, and hence the drive voltage V1 is preferably a constant voltage. The initiation of the application of the voltage of the driving power supply 8 or the retention of a state in which the voltage is applied is performed by a signal of the controller 10. In the present invention, a state in which the constant voltage is applied is retained in the period for which the optical transmittance of the EC element 1 is controlled.

The resistance switching device 9 switches a resistance R1 and a resistance R2, which has a resistance value larger than that of the resistance R1, from one to another, and connects the selected one of the resistances in series to a closed circuit including the driving power supply 8 and the EC element 1. It is preferred that a resistance value of the resistance R1 be smaller than at least the largest impedance in the element closed circuit, and the resistance value is preferably 10Ω or smaller. It is preferred that the resistance value of the resistance R2 be larger than the largest impedance in the element closed circuit, and the resistance value is preferably 1 MΩ or larger. It is to be noted that the resistance R2 may be air. In this case, the closed circuit is an open circuit in a strict sense, but when the air is assumed as the resistance R2, the open circuit may be considered to be the closed circuit.

The controller 10 sends a switch signal to the resistance switching device 9 to control the switching between the resistance R1 and the resistance R2.

Figure 3:
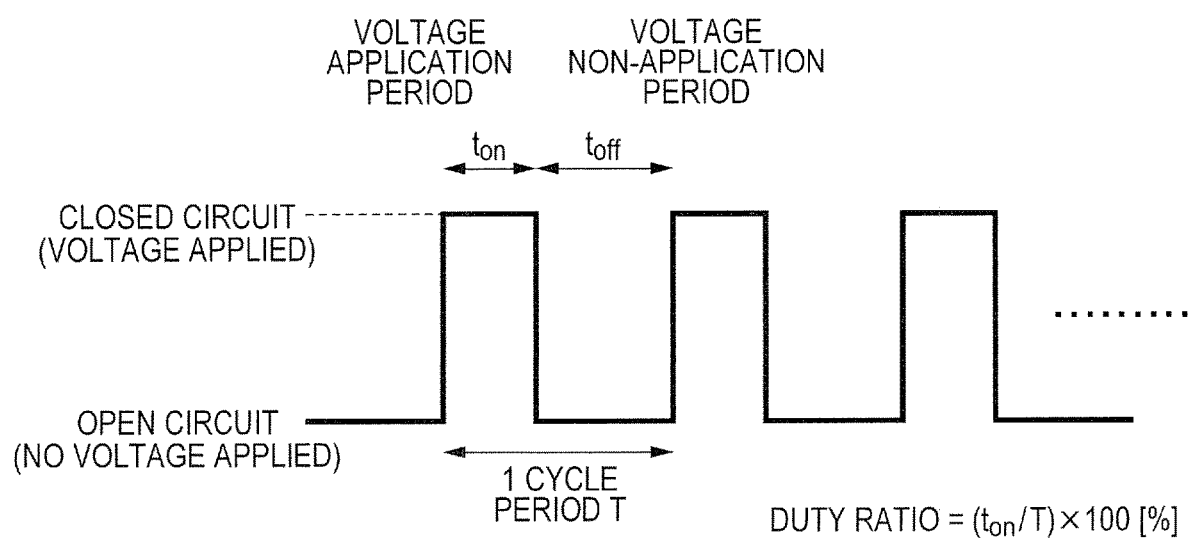
FIG. 3 is a diagram for illustrating an example of the driving control mode of the EC element of the present invention.

FIG. 3 is a diagram for illustrating an example of the driving control mode of the EC element of the present invention. In FIG. 3, from a driving starting point t=ON, the constant voltage V1 causing an electrochemical reaction in the EC layer is applied to the EC element 1 by the driving power supply 8. The resistance switching device 9 receives a signal of the controller 10 to switch and connect the resistance R1 or the resistance R2 to the closed circuit including the EC element 1 and the driving power supply 8. It is to be noted that when the resistance R2 is air, the resistance switching device 9 performs switching between the connection and non-connection of a wiring in a state in which the constant voltage V1 is applied. That is, a closed circuit state and an open circuit state are switched with each other by the operation of the resistance switching device 9. The closed circuit state is a voltage applied state, and the open circuit state is a state in which a high resistance (air) is inserted into the power supply in series. It is to be noted that in the following description, the open circuit state is referred to as "voltage non-applied state," and its period is referred to as "voltage non-application period" in some cases. The "voltage non-applied state" in the present invention includes not only a state in which the high resistance is inserted into the power supply in series in the state in which the constant voltage V1 is applied but also a state in which no voltage is applied. In addition, the "voltage non-application period" includes not only the period for which the high resistance is inserted into the power supply in series in the state in which the constant voltage V1 is applied but also the period for which no voltage is applied. In addition, in the voltage non-applied state, an erasing voltage that returns a material colored by the application of the voltage V1 to a decolored state may be applied.

The switching between the voltage applied state and the voltage non-applied state is controlled by the controller 10, and the controller 10 sends, to the resistance switching device 9, the continuous pulse having the one cycle (period T) corresponding to a sum of a voltage application period $t_{on}$ and a voltage non-application period $t_{off}$. The ratio of the voltage application period to the one cycle at this time is defined as the duty ratio.

When the duty ratio of pulse driving is retained, an EC material colors in the voltage application period $t_{on}$, and the self-decoloring of the EC material occurs in the non-application period $t_{off}$. The self-decoloring phenomenon results from, for example, the instability of a cation or an anion of the EC material produced by an electrochemical reaction, the diffusion of the cation or the anion to a counter electrode having a different potential, and collision between the cation and the anion. When a balance is reached between the colored amount and the self-decoloring amount, an absorbance is retained. When the organic EC element is driven at a fixed duty ratio under the constant voltage of the driving power supply, a change in absorbance is saturated after passing through the transitional state, and then the saturated absorbance is maintained. In order to decrease the absorbance, it is only necessary that the duty ratio be fixed to the one smaller than the last duty ratio. Further, in order to increase the absorbance, it is only necessary that the duty ratio be fixed to the one larger than the last duty ratio.

It is because the organic EC element has the self-decoloring phenomenon that the magnitude of the absorbance can be controlled by such intermittent driving of the drive voltage V1, and hence the driving method can be said to be a method suitable for the organic EC element. At that time, when one cycle of a control signal is long, an increase or decrease of an absorbance change is viewed in some cases, and hence the one cycle is preferably 100 milliseconds or less, more preferably 10 milliseconds or less.

<Combination of EC Materials>

An EC element for an investigation was produced. The construction of the EC element is as illustrated in FIG. 1, and two ITO substrates (obtained by forming the electrodes 3 and 5 formed of ITO on the substrates 2 and 6 made of glass) are bonded to each other through the spacer 4 having a thickness of 150 μm. It is to be noted that a porous layer formed of $SnO_2$ particles is formed on one of the ITO electrodes. In addition, the EC layer 7 is present in a space formed by the substrates 2 and 6, and the spacer 4. A solution obtained by dissolving Compounds 1 to 4 serving as anode EC materials in a propylene carbonate solvent together with a supporting electrolyte tetrabutylammonium perchlorate (TBAP) is injected as the EC layer 7. The concentrations of Compounds 1 to 4 are 2 mM, 8 mM, 13 mM, and 30 mM, respectively, and the concentration of TBAP is 0.1 M. Compounds 1 to 4 react to the application of a drive voltage on the flat ITO electrode serving as a working electrode, and the ITO electrode with the porous layer is used as a counter electrode.

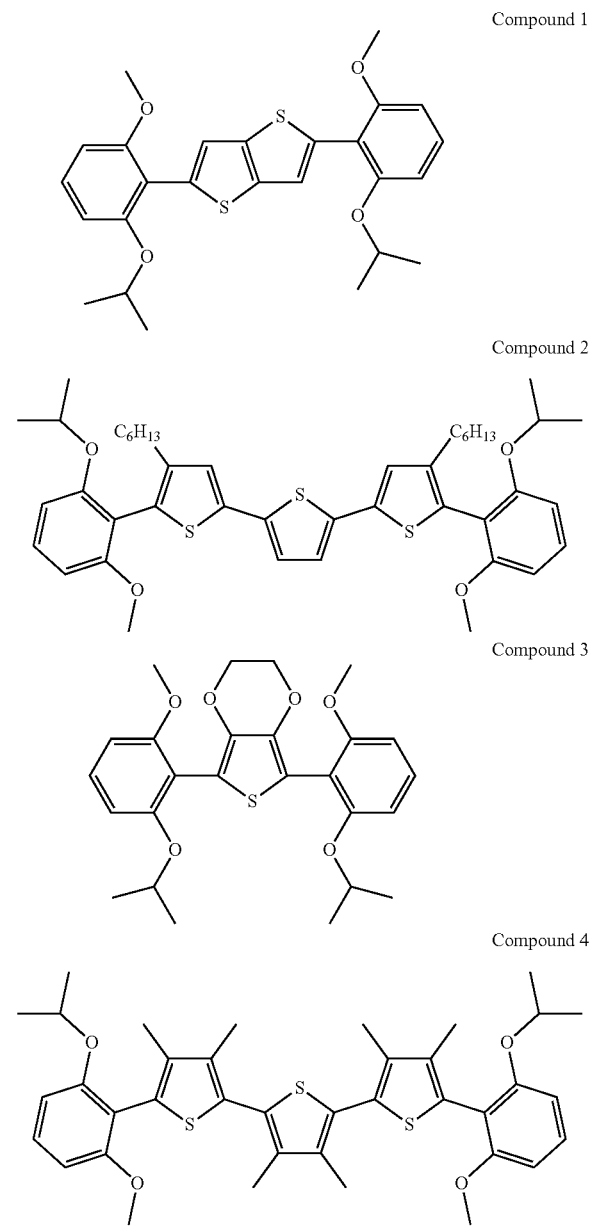

The oxidation potentials and molecular lengths of Compounds 1 to 4 are shown in Table 1. The oxidation potentials were determined by cyclic voltammetry, and were represented with reference to the potential of ferrocene. It is to be noted that the same holds true for their reduction potentials. Molecular length ratios (large molecular length/small molecular length) between Compound 2 and Compound 3, and between Compound 3 and Compound 4 are more than 1.4. In addition, the absolute values of differences in oxidation potential between Compound 1 and Compound 3, between Compound 1 and Compound 4, and between Compound 2 and Compound 3 are more than 60 mV.

TABLE 1

|  | Compound 1 | Compound 2 | Compound 3 | Compound 4 |
| --- | --- | --- | --- | --- |
| Oxidation potential [mV] | 385 | 419 | 515 | 468 |
| Molecular length [Å] | 14.7 | 19.3 | 12.0 | 18.3 |

Figure 4A:
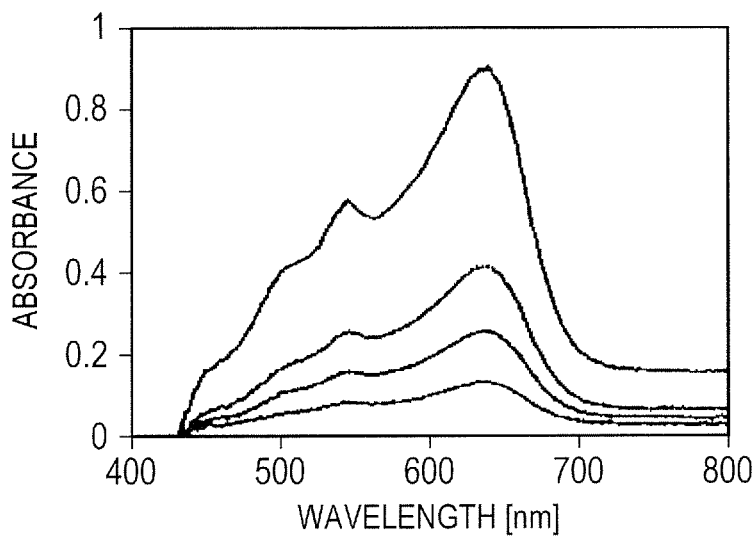
FIG. 4A and FIG. 4B are graphs for showing the absorption spectra of an EC element for an investigation when the element is driven by pulse width modulation.
Figure 4B:
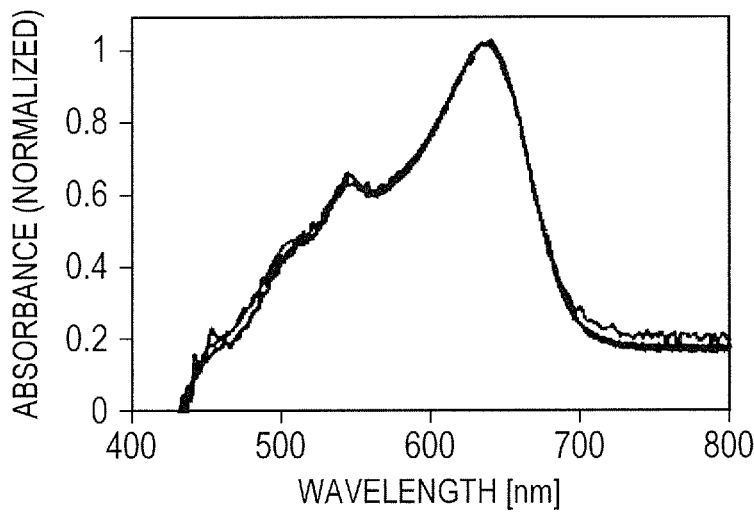

The absorption spectra of the produced EC element for an investigation when the element is driven at room temperature by pulse width modulation are shown in FIG. 4A and FIG. 4B. In the pulse width modulation driving, an applied voltage was fixed to 1.7 V, and a voltage application period and a non-application period were alternately switched with each other at an arbitrary duty ratio. One cycle of a pulse is 100 Hz (10 milliseconds), and duty ratios were set to 0.025%, 0.5%, 0.1%, and 1%, respectively. A larger duty ratio means that the voltage application period occupying the one cycle of the pulse increases. The absorbance of the EC element was changed by driving the element from a decolored state at each duty ratio. FIG. 4A is a graph for showing absorption spectra at the time of saturation by the pulse width modulation driving, and FIG. 4B is a graph obtained by normalizing the absorption spectra of FIG. 4A at 630 nm and superimposing the normalized spectra. As the duty ratio increased, an absorbance to be reached increased and hence gradation control was able to be performed. In addition, the shapes of the absorption spectra at respective gradations were substantially uniform. Therefore, the use of a pulse width modulation driving method under a constant voltage enables gradation control and the retention of an absorption spectrum even when oxidation potentials in anode EC materials (reduction potentials in cathode EC materials) are not uniform, and hence the pulse width modulation driving method is an additionally preferred driving method. However, when the oxidation potentials of the anodic EC materials or the reduction potentials of the cathodic EC materials are substantially uniform, a driving method involving changing the wave height value of a pulse, i.e., the magnitude of an applied voltage to perform the control may be adopted. Herein, the phrase "substantially uniform" means that a difference between the oxidation potentials of the anodic EC materials and a difference between the reduction potentials of the cathodic EC materials are each 60 mV or less, preferably 20 mV or less, more preferably 10 mV or less.

Figure 5:
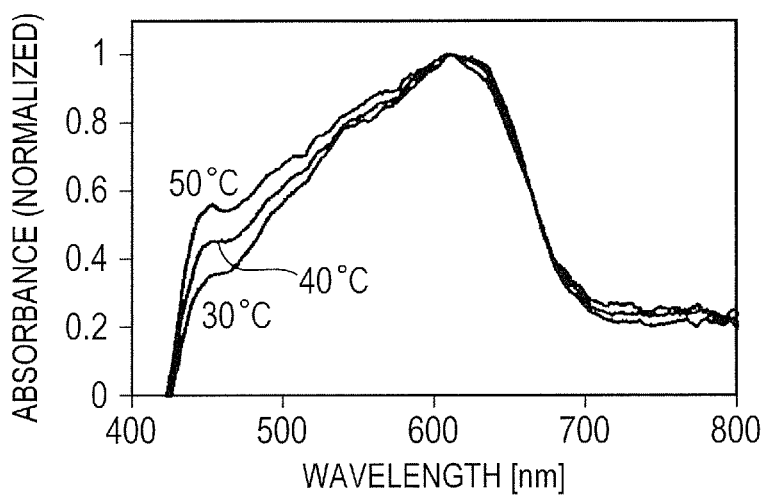
FIG. 5 is a graph for showing the absorption spectra of the EC element for an investigation when the element is driven under different environment temperatures.

In this case, a molecular length ratio (large molecular length/small molecular length) between part of the anode EC materials of the EC element for an investigation is more than 1.4. FIG. 5 is a graph for showing the absorption spectra of the EC element for an investigation when the element is driven under a constant voltage and at respective temperatures of 30° C., 40° C., and 50° C. The voltage is set to 1.8 V and a duty ratio is set to 100%. When the absorbance of the element was changed by driving the element from a decolored state at each temperature, the shape of its absorption spectrum changed from temperature to temperature. This is because the respective materials are different from each other in temperature dependence of an electrochemical reaction. Accordingly, even when the element is driven under the constant voltage, a difference occurs in a reaction amount ratio between the anode EC materials (the cathode EC materials) as a driving environment temperature changes, with the result that the shape of the absorption spectrum cannot be retained. Accordingly, a contrivance to uniformize the temperature dependences of the anode EC materials or the cathode EC materials is required.

An investigation made by the inventors of the present invention has found that the following methods are effective in uniformizing the temperature dependences of the anode EC materials or the cathode EC materials: first, to uniformize the sizes of the molecules of the respective materials; and secondly, to uniformize the oxidation potentials/reduction potentials of the respective materials. The reason why such phenomenon occurs is described below.

In the electrochemical electrode reaction of an EC material, the following two factors can be considered to be dominant factors: the diffusion of the EC material, and electron transfer between an electrode and the EC material.

Of those, the diffusion can be represented by the Stokes-Einstein equation represented by the following equation (1).

$$D = \frac{k_B T}{6\pi \cdot a \cdot \eta(T)} \quad (1)$$

In the equation, D represents a diffusion coefficient, $k_B$ represents Boltzmann's constant, T represents a temperature, a represents a half of a molecular size, and $\eta(T)$ represents the viscosity of a solvent including a temperature term.

As can be seen from the equation (1), the diffusion coefficient D uses the size a of a molecule and the temperature T as parameters, and the diffusion coefficient changes with the size of the molecule and the diffusion coefficient changes with the temperature as well. However, when a ratio between the diffusion coefficients of materials in a mixed solution is considered, the ratio becomes always constant because their temperature terms are offset. That is, even when the driving environment temperature changes to change the diffusion coefficients of the respective materials, the ratio between the diffusion coefficients of the materials does not change. Accordingly, it is hard to consider that the diffusion term leads to a change in absorption spectrum with a temperature change.

On the other hand, with regard to the electron transfer, the Butler-Volmer equation represented by the following equation (2) is the best known equation in the field of electrochemistry.

$$i = i_0 \left[ \exp\left(\frac{\alpha n F(E - E_0)}{RT}\right) - \exp\left(\frac{(1-\alpha) n F(E - E_0)}{RT}\right) \right] \quad (2)$$

In the equation, i represents a current density, $i_0$ represents an exchange current density, α represents a transfer coefficient, n represents a charge number, F represents the Faraday constant, E represents an electrode potential, $E_0$ represents the oxidation potential (reduction potential) of a material, R represents a gas constant, and T represents a temperature.

A reaction current flowing under electron transfer limitation uses the oxidation-reduction potential $E_0$ of the material and the temperature T as parameters, and these parameters are defined in an exponential function term. Accordingly, a ratio between the reaction currents of materials having different oxidation potentials (reduction potentials) does not become constant with the temperature. Accordingly, the uniformization of the oxidation potentials (reduction potentials) of the materials is effective in uniformizing the reaction amounts of the materials.

In addition, with regard to the electron transfer, the Marcus theory represented by the following equations (3) to (5) is known.

$$k = ZA \, \exp\left(-\frac{G^*}{RT}\right) \quad (3)$$

$$G^* = \frac{L_e}{8}\left(1 + \frac{\Delta G}{L_e}\right)^2 \quad (4)$$

$$L_e = \left(\frac{q_2}{16\pi\varepsilon_0}\right)\left(\frac{1}{a}\right)\left(\frac{1}{n^2} - \frac{1}{\varepsilon}\right) \quad (5)$$

In the equations, k represents a rate constant, Z represents a collision frequency, A represents a non-adiabatic factor, $G^*$ represents an activation energy, R represents a gas constant, T represents a temperature, $L_e$ represents a reorientation energy in an electrode reaction, $\Delta G$ represents a reaction free energy, q represents the elementary charge, $\varepsilon_0$ represents the permittivity of vacuum, $\varepsilon$ represents the relative permittivity of a solvent, a represents a half of a molecular size, and n represents the refractive index of the solvent.

According to the Marcus theory, the size of a molecule affects the electron transfer term. When a material having polarity changes its electronic state through the exchange of an electron, a change in polarity is accompanied by the reorientation of solvent molecules surrounding the material. The activation energy $G^*$ in the rate constant k of electron transfer between an electrode and the material is defined by the reorientation energy $L_e$ of the solvent molecules, and the $L_e$ uses the size a of the molecules as a parameter. Accordingly, the uniformization of the sizes of the molecules of materials is effective in uniformizing the rate constants of electron transfer of the materials.

As described above, the activation energy of a material dominating its temperature dependence is affected not by diffusion but by electron transfer. In addition, the uniformization of the oxidation potentials (reduction potentials) of materials and the sizes of their molecules is effective in uniformizing their rate constants of electron transfer.

In an investigation made by the inventors of the present invention, the following result has been obtained: a molecular size has an influence larger than that of an oxidation potential/reduction potential. Accordingly, it is necessary that all of the anode EC materials or the cathode EC materials have an equal molecular length, or have a molecular length ratio of (large molecular length)/(small molecular length) of 1.4 or less. Further, it is preferred that all of the anode EC materials or the cathode EC materials have an equal molecular length, or have a molecular length ratio of (large molecular length)/(small molecular length) of 1.2 or less. In addition, in the Marcus theory, the size of a molecule is defined as a sphere using the a in the equation (5) as a radius. The molecular structure of an actual electrochromic material is not a sphere as observed in Compounds 1 to 4 but a structure defined by a long axis and a short axis. If the planarity of the molecule is regarded as being substantially uniform, the definition of the size of the molecule as an area that is the product of the long axis and the short axis may enable the size to be treated as more reflecting the molecular structure.

When the molecular size is defined as the area, all of the anodic EC materials or the cathodic EC materials need to have an equal area or an area ratio of (large area)/(small area) of 2.2 or less. Further, it is preferred that all of the anodic EC materials or the cathodic EC materials have an equal area or an area ratio of (large area)/(small area) of 1.3 or less.

In addition, when the EC layer contains the two or more kinds of anode EC materials, all absolute values of differences in oxidation potential between the anode EC materials are preferably 60 mV or less, more preferably 20 mV or less. Similarly, when the EC layer contains the two or more kinds of cathode EC materials, all absolute values of differences in reduction potential between the cathode EC materials are preferably 60 mV or less, more preferably 20 mV or less. Further, when the EC layer contains the two or more kinds of anode EC materials and the two or more kinds of cathode EC materials, it is preferred that all of the anode EC materials and the cathode EC materials have an equal molecular length, or have a molecular length ratio of (large molecular length)/(small molecular length) of 1.4 or less. Alternatively, it is preferred that all of the materials have an equal area or an area ratio of (large area)/(small area) of 2.2 or less.

<<Optical Filter>>

An optical filter of the present invention has the EC element of the present invention. The optical filter of the present invention preferably has a drive unit configured to drive the EC element. For example, the EC apparatus illustrated in FIG. 2 is applicable as the optical filter, and the filter may further include a peripheral apparatus. In addition, the optical filter of the present invention may have an active element connected to the EC element. The active element may be directly connected to the EC element, or may be indirectly connected thereto through any other element.

The optical filter may be used in an imaging apparatus, such as a camera. When used in the imaging apparatus, the optical filter may be provided in a main body of the imaging apparatus, or may be provided in a lens unit. Now, a case is described where a neutral density (ND) filter is formed as the optical filter.

The neutral density filter absorbs black, and needs to absorb light uniformly in a visible light region. In order to realize the black absorption with the use of the organic EC material, it is only necessary that a plurality of materials having different absorption regions in the visible light region be mixed to make absorption flat in the visible light region. The absorption spectrum in the case of mixing the organic EC materials is expressed by a sum of the absorption spectra of the respective materials, and hence the black absorption can be realized by selecting a plurality of materials having appropriate wavelength regions and adjusting concentrations thereof.

In general, one low-molecular weight organic EC material can cover only a wavelength region having a width of from 100 nm to 200 nm. At least three kinds of organic EC materials are preferably used for covering the entirety of the region of from 380 nm to 750 nm serving as a visible light region. For example, it is preferred that three or more kinds of anode EC materials or three or more kinds of cathode EC materials, or two or more kinds of anode EC materials and two or more kinds of cathode EC materials be used as organic EC materials.

An example of driving the neutral density (ND) filter according to the present invention is described below. In general, the neutral density (ND) filter reduces an amount of light to $\frac{1}{2^n}$ (where n is an integer). When the amount of light is reduced to ½, the transmittance is reduced from 100% to 50%. When the amount of light is reduced to ¼, the transmittance is reduced from 100% to 25%. Further, when the transmittance is reduced to ½, from a relationship of −log(transmittance)=(absorbance), the absorbance change amount is 0.3, and when the transmittance is reduced to ¼, the absorbance change amount is 0.6. In order to reduce the light amount so that the transmittance varies from ½ to 1/64, it is only necessary that the absorbance change amount be controlled to be from 0 to 1.8 in units of 0.3.

When the EC layer is in a solution state, the absorbance change amount includes a change amount of the colored amount that is caused by a fluctuation of the solution. In order to achieve accurate control, the optical filter may be equipped with an external monitor configured to measure a light amount as a part of the optical filter.

<<Imaging Apparatus and Lens Unit>>

An imaging apparatus according to the present invention includes the above-mentioned optical filter according to the present invention and a light-receiving element configured to receive light that has been transmitted through the optical filter.

Further, a lens unit according to the present invention includes the above-mentioned optical filter according to the present invention and an optical system including a plurality of lenses. The optical filter may be disposed so that the light that has been transmitted through the optical filter is then transmitted through the optical system. Alternatively, the optical filter may be disposed so that the light that has been transmitted through the optical system is then transmitted through the optical filter.

Figure 6A:
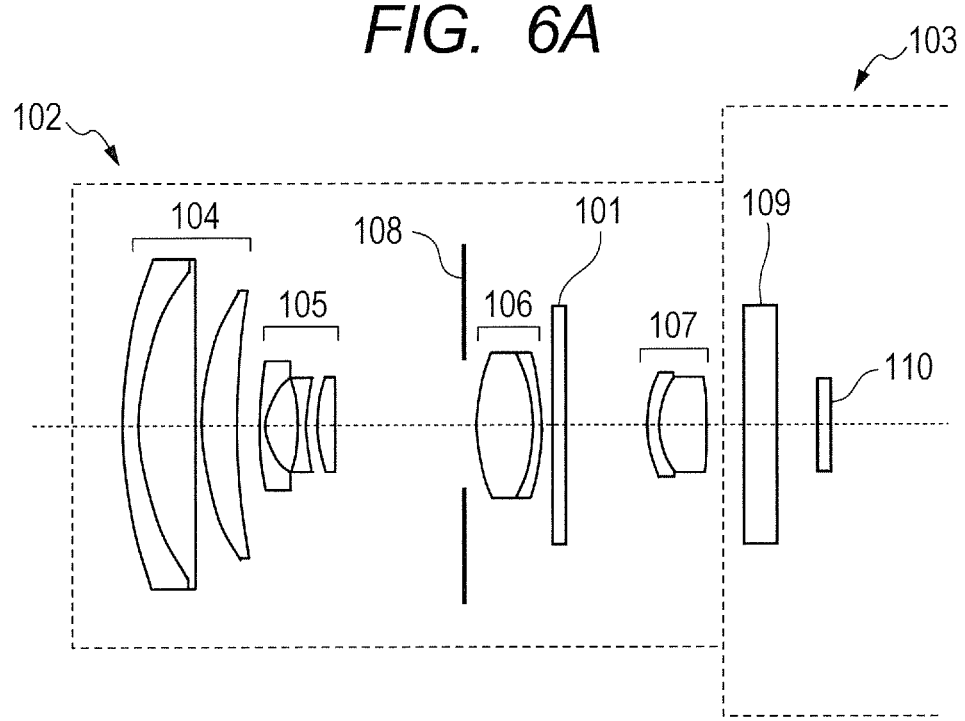
FIG. 6A and FIG. 6B are views for illustrating an example of an imaging apparatus of the present invention.
Figure 6B:
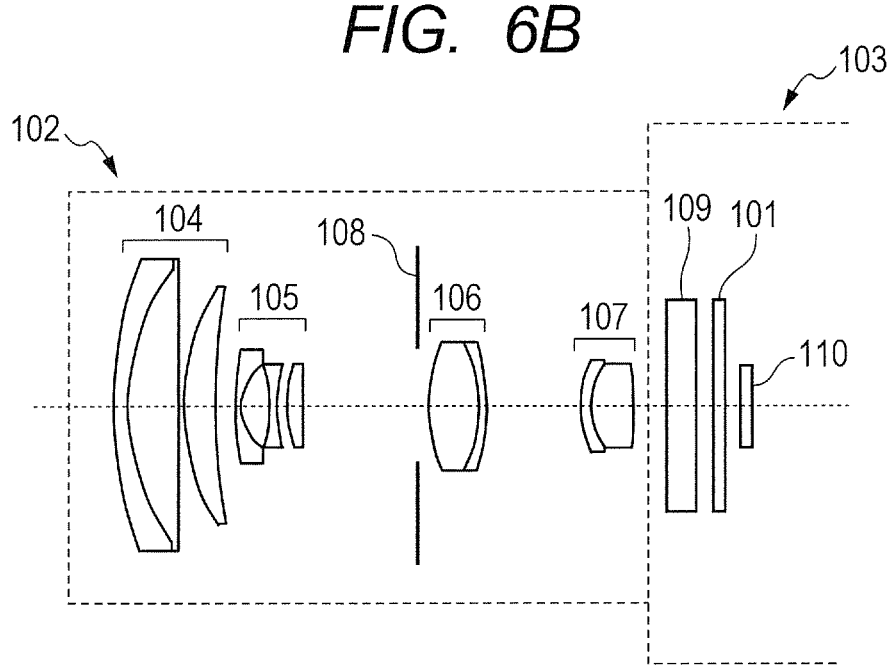

FIG. 6A and FIG. 6B are schematic views for illustrating imaging apparatus using the optical filter of the present invention, and FIG. 6A is an illustration of an imaging apparatus having a lens unit using the optical filter of the present invention and FIG. 6B is an illustration of an imaging apparatus having the optical filter of the present invention. As illustrated in FIG. 6A and FIG. 6B, a lens unit 102 is removably connected to an imaging apparatus 103 through a mounting member (not shown).

The lens unit 102 is a unit including a plurality of lenses or lens groups. For example, the lens unit 102 illustrated in FIG. 6A is a rear-focus zoom lens configured to perform focusing behind a diaphragm. The lens unit 102 includes, in order from a subject side (left side of the drawing), four lens groups of a first lens group 104 having a positive refractive power, a second lens group 105 having a negative refractive power, a third lens group 106 having a positive refractive power, and a fourth lens group 107 having a positive refractive power. An interval between the second lens group 105 and the third lens group 106 is changed to vary magnification, and a part of lenses of the fourth lens group 107 is moved to perform focusing. For example, the lens unit 102 includes a diaphragm 108 disposed between the second lens group 105 and the third lens group 106, and further includes an optical filter 101 disposed between the third lens group 106 and the fourth lens group 107. Those components are disposed so that the light to be transmitted through the lens unit 102 is transmitted through the lens groups 104 to 107, the diaphragm 108, and the optical filter 101, and the amount of light can be adjusted with the use of the diaphragm 108 and the optical filter 101.

Further, a configuration of the components of the lens unit 102 can be modified appropriately. For example, the optical filter 101 may be disposed in front of the diaphragm 108 (on the subject side thereof), or may be disposed behind the diaphragm 108 (on the imaging apparatus 103 side thereof). Alternatively, the optical filter 101 may be disposed in front of the first lens group 104, or may be disposed behind the fourth lens group 107. When the optical filter 101 is disposed at a position where light converges, there is an advantage in that an area of the optical filter 101 can be reduced, for example. Further, a mode of the lens unit 102 can also be selected appropriately. Instead of the rear-focus zoom lens, the lens unit 102 may also be an inner-focus zoom lens configured to perform focusing in front of the diaphragm, or may be another type of zoom lens configured to perform focusing in another way. Further, instead of the zoom lens, a special-purpose lens, such as a fisheye lens or a macro lens, can also be selected appropriately.

A glass block 109 of the imaging apparatus is a glass block such as a low-pass filter, a face plate, or a color filter. Further, a light-receiving element 110 is a sensor unit configured to receive light that has been transmitted through the lens unit 102, and an imaging element such as a CCD or a CMOS may be used as the light-receiving element 110. Further, the light-receiving element 110 may also be an optical sensor such as a photodiode, and a device configured to acquire and output information on intensity or wavelength of light can be used appropriately as the light-receiving element 110.

When the optical filter 101 is built into the lens unit 102 as illustrated in FIG. 6A, a drive unit may be disposed within the lens unit 102, or may be disposed outside the lens unit 102. When the drive unit is disposed outside the lens unit 102, the EC element and the drive unit, which are respectively disposed within and outside the lens unit 102, are connected to each other through wiring, and the drive unit drives and controls the EC element.

As illustrated in FIG. 6B, the imaging apparatus 103 itself may include the optical filter 101 according to the present invention. The optical filter 101 is disposed at an appropriate position within the imaging apparatus 103, and it is only necessary that the light-receiving element 110 be disposed so as to receive the light that has been transmitted through the optical filter 101. In FIG. 6B, for example, the optical filter 101 is disposed immediately in front of the light-receiving element 110. When the imaging apparatus 103 itself has the optical filter 101 built therein, the lens unit 102 itself connected to the imaging apparatus 103 does not need to include the optical filter 101, and hence it is possible to form the imaging apparatus using an existing lens unit and being capable of controlling light.

The imaging apparatus described above is applicable to a product having a combination of a function of adjusting a light amount and a light-receiving element. The imaging apparatus can be used in, for example, a camera, a digital camera, a video camera, or a digital video camera. The imaging apparatus is also applicable to a product having the imaging apparatus built therein, such as a mobile phone, a smartphone, a PC, or a tablet computer.

Through the use of the optical filter according to the present invention as a light control member, it is possible to appropriately vary a light amount to be controlled with the use of one filter, and there is an advantage in that the number of members can be reduced and that a space can be saved, for example.

<<Window Member>>

Figure 7A:
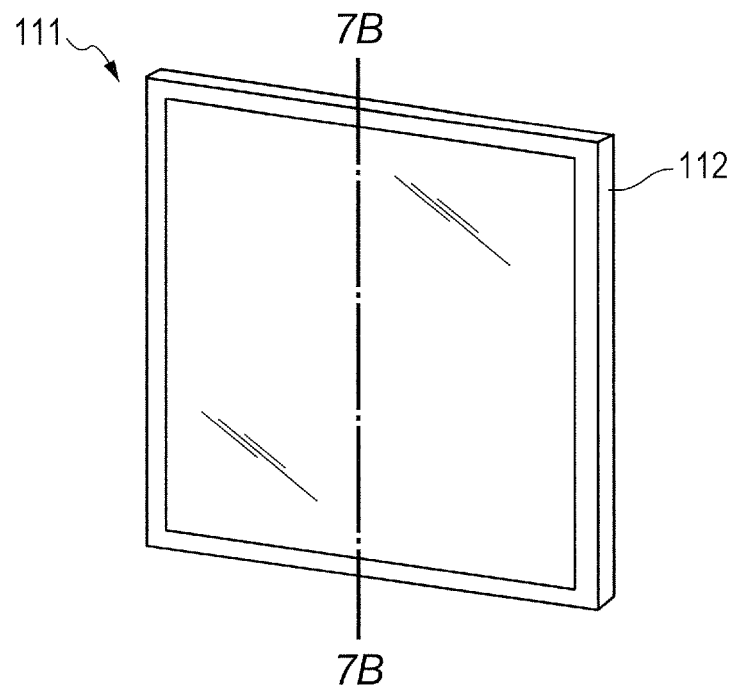
FIG. 7A and FIG. 7B are views for illustrating an example of a window member of the present invention.
Figure 7B:
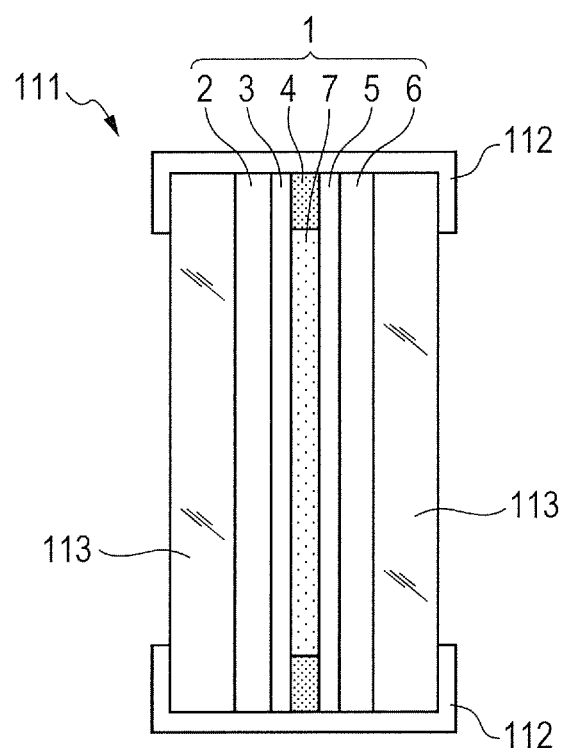

A window member according to the present invention includes the above-mentioned EC element according to the present invention. The window member according to the present invention preferably includes a drive unit for driving the EC element. For example, the EC apparatus illustrated in FIG. 2 is applicable to the window member. FIG. 7A and FIG. 7B are views each for illustrating the window member according to the present invention. FIG. 7A is a perspective view of the window member, and FIG. 7B is a sectional view taken along the line 7B-7B of FIG. 7A.

The window member 111 of FIG. 7A and FIG. 7B is a light control window, and includes the EC element 1, transparent plates 113 for sandwiching the EC element 1 therebetween, and a frame 112 for surrounding the entire window member to integrate those components into one window member. The drive unit may be built into the frame 112, or may be disposed outside the frame 112 and connected to the EC element 1 through wiring.

The transparent plates 113 are not particularly limited as long as being made of a material having a high optical transmittance. Considering the use of the window member 111 as a window, it is preferred that the transparent plates 113 be made of glass materials. In FIG. 7A and FIG. 7B, the EC element 1 is a constituent member independent of the transparent plates 113, but for example, the substrates 2 and 6 of the EC element 1 may be regarded as the transparent plates 113.

A material property of the frame 112 is not limited, but any member that covers at least a part of the EC element 1 and has a form of being integrated into one frame may be regarded as the frame.

The light control window described above is applicable to, for example, use of adjusting an amount of sunlight entering a room during the daytime. The light control window can be used to adjust not only the amount of sunlight but also a heat quantity, and hence can be used to control brightness and temperature of the room. Further, the light control window is also applicable to use as a shutter to prevent an indoor view from being seen from the outside of the room. The light control window described above is applicable not only to a glass window for a construction, but also to a window of a vehicle such as an automobile, a train, an airplane, or a ship, and to a filter of a display surface of a clock, a watch, or a mobile phone.

EXAMPLE 1

In this example, an anodic EC material that forms cations from neutral species through an oxidation reaction to be colored is taken as an example of an organic EC material, and the result of the measurement of the shape of an absorption spectrum with a driving environment temperature when anodic EC materials are combined is described.

First, the temperature dependence of the absorption spectrum of a mixed solution containing two kinds of organic EC materials was measured.

The used organic EC materials are Compounds 3 and 5 to 9 shown below, and the oxidation potentials and molecular lengths of the respective materials, and the molecular plane areas thereof determined from the long axes and short axes of the molecular lengths are shown in Table 2. It is to be noted that the oxidation potentials were determined by cyclic voltammetry, and were represented with reference to the potential of ferrocene. Each of the compounds is the following thiophene-based anode EC material: when the material electrochemically oxidizes from a neutral state to form a cation, the material shows absorption in a visible region. In addition, in the case of a material whose cation species formed an association, the absorption of the association might lead to a fluctuation in spectrum, and hence a material reduced in influence of association formation was selected.

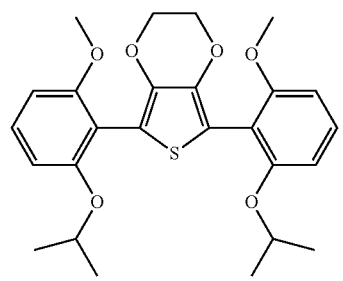

Compound 3

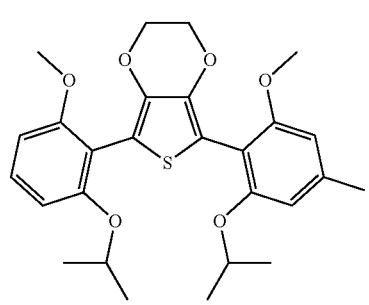

Compound 5

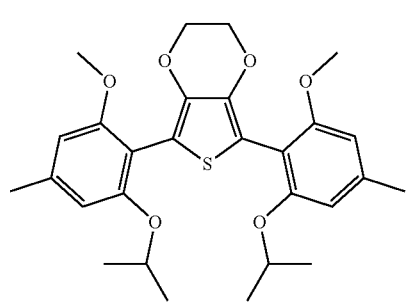

Compound 6

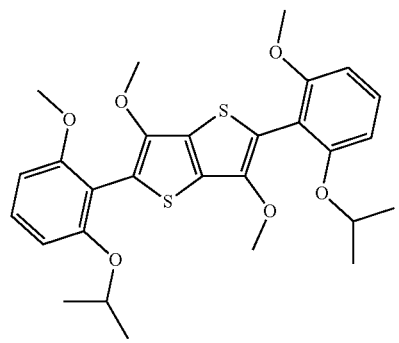

Compound 7

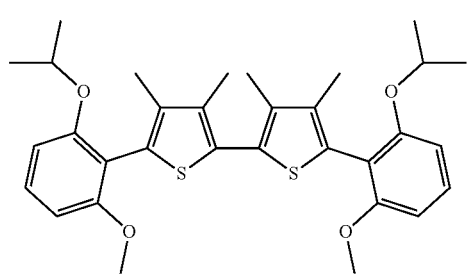

Compound 8

-continued

Compound 9

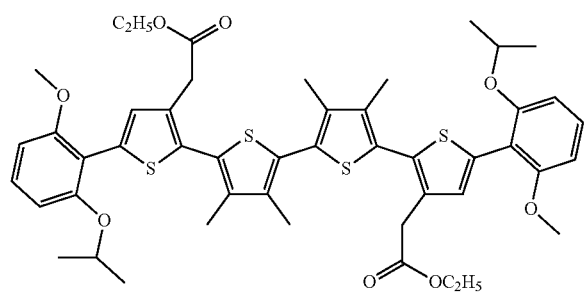

of the two materials are determined. A reaction amount ratio between materials having a uniform activation energy of the absorbance does not change with the temperature change, and hence the absorption spectrum is retained against the temperature change.

The absolute value of a difference in oxidation potential between respective materials and a molecular length ratio of (large molecular length)/(small molecular length), and an area ratio of (large area)/(small area) therebetween are shown in Table 3. Whether or not the retention of an absorption spectrum against a temperature change is satisfactory is also represented in three stages (□, ○, and × in order of decreasing satisfactoriness) in Table 3. In addition, whether or not the retention of the absorption spectrum against the temperature change is satisfactory is plotted in

TABLE 2

|  | Compound 3 | Compound 5 | Compound 6 | Compound 7 | Compound 8 | Compound 9 |
|---|---|---|---|---|---|---|
| Oxidation potential [mV] | 515 | 446 | 403 | 454 | 463 | 450 |
| Molecular length long axis [Å] | 12.0 | 13.3 | 14.5 | 14.7 | 16.1 | 23.1 |
| Molecular length short axis [Å] | 9.2 | 9.1 | 9.1 | 9.5 | 9.4 | 14.5 |
| Molecular length [Å] | 12.0 | 13.3 | 14.5 | 14.7 | 16.1 | 23.1 |

A mixed solution containing two kinds of organic EC materials shown in Table 3 was prepared by using TBAP as a supporting electrolyte and propylene carbonate (PC) as an organic solvent. The concentrations of the respective EC materials are from several millimoles per liter to several tens of millimoles per liter, and the concentration of TBAP is 0.1 M.

Used in the measurement of the mixed solution was a glass cell having an optical path length of 1 mm obtained by arranging a mesh-like platinum electrode (working electrode; WE) and a wire-like platinum electrode (counter electrode; CE), and placing a reference electrode RE (Ag/Ag$^+$). The EC materials were oxidized and colored by the mesh electrode, and an ultraviolet-visible-near infrared absorption spectrum was measured by using transmitted light passing the mesh electrode. A potentiostat manufactured by Solartron (CELLTEST 1470E) was used in the application of a drive voltage, a spectrometer manufactured by Ocean Optics (USB2000-UV-VIS) was used in spectrometry, and a change in absorbance of an EC material associated with the application of the voltage was measured at 1 scan/sec. A measurement sample, an electric wiring, and an optical fiber cable were introduced into the chamber of an environment tester manufactured by Horiba Stec, Co., Ltd., and electrical characteristics and an absorption spectrum were measured under temperature control in the range of from 0° C. to 50° C.

Whether or not the retention of an absorption spectrum against a temperature change was satisfactory was evaluated as described below. An absorption spectrum obtained for a certain combination of two materials at each temperature is divided into the absorptions of the respective materials by fitting. The relationship of an absorbance to be reached by each material with a temperature change is subjected to Arrhenius plotting. Thus, the activation energies of the absorbances of the respective materials in the combination FIG. 8A where the axis of abscissa indicates the absolute value of the difference in oxidation potential and the axis of ordinate indicates the molecular length ratio. In addition, whether or not the retention of the absorption spectrum against the temperature change is satisfactory is plotted in FIG. 8B where the axis of abscissa indicates the absolute value of the difference in oxidation potential and the axis of ordinate indicates the area ratio.

TABLE 3

| Organic EC material | | Absolute value of difference in oxidation potential [mV] | Molecular length ratio | Area ratio | Whether or not retention of absorption spectrum is satisfactory |
|---|---|---|---|---|---|
| Compound 3 | Compound 7 | 61 | 1.225 | 1.265 | ○ |
| Compound 3 | Compound 8 | 52 | 1.342 | 1.371 | ○ |
| Compound 3 | Compound 9 | 65 | 1.925 | 3.034 | × |
| Compound 5 | Compound 7 | 8 | 1.105 | 1.154 | □ |
| Compound 5 | Compound 8 | 17 | 1.211 | 1.250 | □ |
| Compound 6 | Compound 7 | 51 | 1.014 | 1.058 | ○ |
| Compound 6 | Compound 8 | 60 | 1.110 | 1.147 | ○ |
| Compound 6 | Compound 9 | 47 | 1.593 | 2.538 | × |
| Compound 7 | Compound 8 | 9 | 1.095 | 1.084 | □ |
| Compound 7 | Compound 9 | 4 | 1.571 | 2.398 | × |
| Compound 8 | Compound 9 | 13 | 1.435 | 2.213 | × |

Figure 8A:
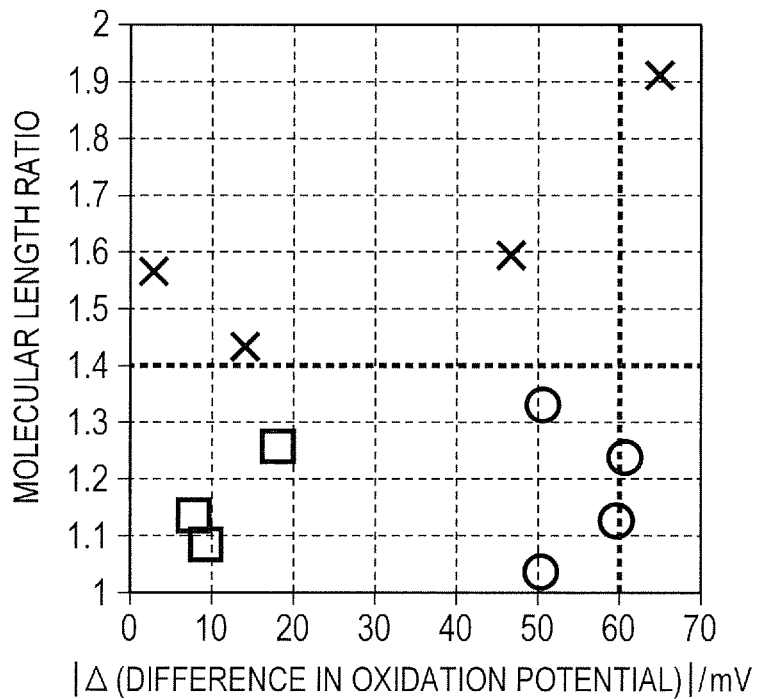
FIG. 8A and FIG. 8B are each a graph obtained by plotting results shown in Table 3.
Figure 8B:
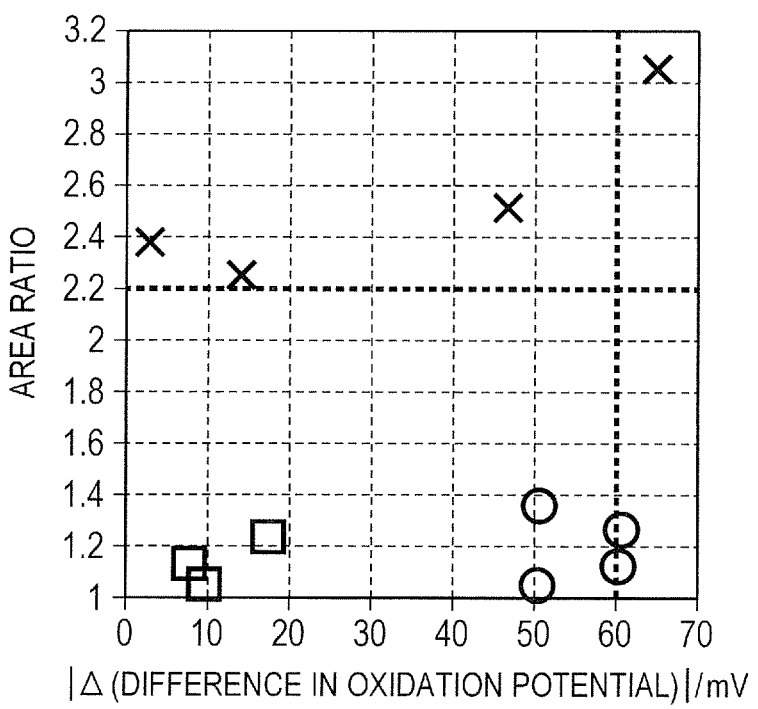

FIG. 8A and FIG. 8B provided the result that when the influences of the "difference in oxidation potential" and the "molecular length ratio" or the "area ratio" were compared, the influence of the "molecular length ratio" or the "area ratio" was more strictly dominant than the other. With regard to the eleven combinations measured in this example, when the molecular length ratio was 1.4 or less, or the area ratio was 2.2 or less, the retention of the absorption spectrum against the temperature change fell within an allowable range. Further, a difference in oxidation potential of 60 mV or less exhibited an additional effect on the retention of the absorption spectrum against the temperature change. Further, it was preferred that the molecular length ratio be 1.2 or less, the area ratio be 1.3 or less, and the difference in oxidation potential be 20 mV or less because the absorption spectrum substantially remained unchanged and was retained against the temperature change, i.e., the ratio and the difference were extremely effective.

In this example, an investigation was made by using the anodic EC materials. However, it can be predicted from the relationships of the equations (2) to (5) that cathodic EC materials also provide similar results. It is to be noted that in the case of the cathodic EC materials, a difference in reduction potential is preferably 60 mV or less, more preferably 20 mV or less.

Based on the investigation, an EC element was produced by using a solution containing two materials (Compound 7 and Compound 8) having a molecular length ratio of 1.4 or less and a difference in oxidation potential of 60 mV or less. The construction of the EC element is as illustrated in FIG. 1, and two glass FTO substrates (obtained by forming the electrodes 3 and 5 formed of fluorine-doped tin oxide thin films on the substrates 2 and 6 made of glass) are bonded to each other through the spacer 4 having a thickness of 125 μm. It is to be noted that a porous film formed of tin oxide particles is formed on one of the FTO surfaces. In addition, the EC layer 7 is present in a space formed by the substrates 2 and 6, and the spacer 4. A solution obtained by dissolving Compound 7 and Compound in a propylene carbonate solvent together with a supporting electrolyte (TBAP) is injected as the EC layer 7. The concentrations of Compound 7 and Compound 8 are 10 mM, and the concentration of TBAP is 0.1 M. A drive voltage is applied with the electrode on which the porous film has not been formed defined as a positive side and the electrode having formed thereon the porous film defined as a negative side. Compound 7 and Compound 8 that form cation species from neutral states through an oxidation reaction show coloring reactions on the positive side electrode on which the porous film has not been formed.

Figure 9:
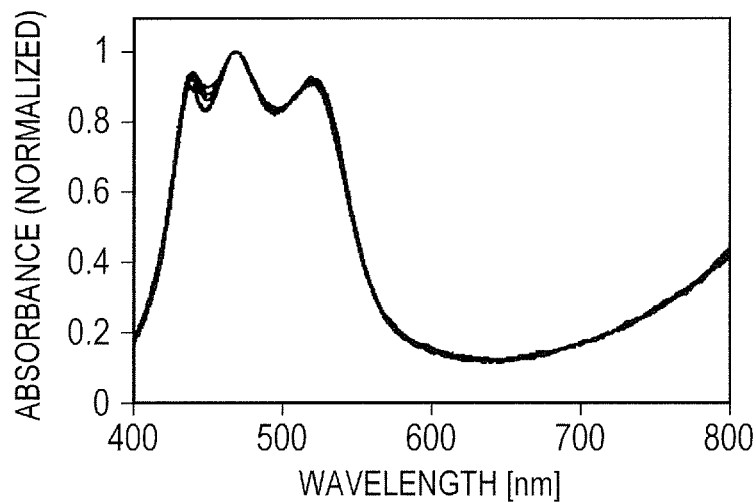
FIG. 9 is a graph obtained by normalizing and superimposing the absorption spectra of an EC element of Example 1 at respective temperatures.

FIG. 9 is a graph obtained by normalizing and superimposing the absorption spectra of the produced EC element at respective temperatures. Used are absorption spectra obtained 5 seconds after the application of a constant voltage of 2.0 V under respective driving environment temperatures of 0° C., 12.5° C., 25° C., 37.5° C., and 50° C., and at a duty ratio of 100%. As illustrated in FIG. 9, the EC element of this example was able to substantially retain the shape of its absorption spectrum against a temperature change. As described above, the temperature characteristics of the anodic materials were able to be uniformized by suitably designing a molecular length ratio, and a difference in oxidation potential, between the materials. It can be assumed that the same holds true for cathodic materials (in this case, a difference in reduction potential is used). It is preferred that those relationships be satisfied also in a viologen derivative serving as a typical cathodic EC material.

Comparative Example 1

An EC element was produced in the same manner as in Example 1 with the exception that two materials (Compound 8 and Compound 9) having a molecular length ratio of more than 1.4 and a difference in oxidation potential of 60 mV or less were used as EC materials.

Figure 10:
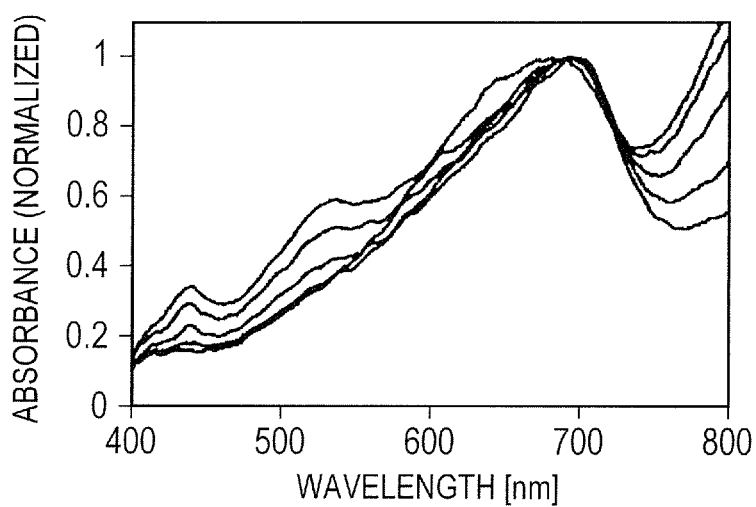
FIG. 10 is a graph obtained by normalizing and superimposing the absorption spectra of an EC element of Comparative Example 1 at respective temperatures.

FIG. 10 is a graph obtained by normalizing and superimposing the absorption spectra of the produced EC element measured in the same manner as in Example 1 at respective temperatures. As illustrated in FIG. 10, the shape of the absorption spectrum of the EC element of this comparative example largely collapsed owing to a temperature change. The difference in oxidation potential between Compound 8 and Compound 9 is about 13 mV, i.e., values for their oxidation potentials are extremely close to each other. On the other hand, the molecular length ratio between the compounds is about 1.43, and the area ratio is 2.21, which deviate from the scope of the present invention, respectively. As can be seen from the foregoing, the following results were obtained: when the influences of the difference in oxidation potential, the molecular length ratio, and the area ratio were compared, the influences of the molecular length ratio and the area ratio were more strictly dominant than the other; and even when the oxidation potentials of the materials were uniform, their temperature characteristics largely differed from each other unless their molecular long axis lengths or the areas were uniform.

Example 2

In this example, a phenazine derivative material is taken as an example of an anodic EC material, and the result of the measurement of the shape of an absorption spectrum with a driving environment temperature when anodic EC materials are combined is described.

First, the temperature dependence of the absorption spectrum of a mixed solution containing two kinds of organic EC materials was measured.

The used organic EC materials are Compounds 10 to shown below, and the oxidation potentials and molecular lengths (long axis lengths and short axis lengths) of the respective materials, and the molecular plane areas thereof obtained by multiplying the long axis lengths and the short axis lengths are shown in Table 4. Incidentally, the oxidation potentials were determined by cyclic voltammetry, and were represented with the potential of ferrocene being used as a criterion. Each of the compounds is the following phenazine-based anode EC material: when the material electrochemically oxidizes from a neutral state to form a cation, the material shows absorption in a visible region. In addition, in the case of a material whose cation species form an association, the absorption of the association might lead to a fluctuation in spectrum, and hence a material which is less influenced by association formation was selected.

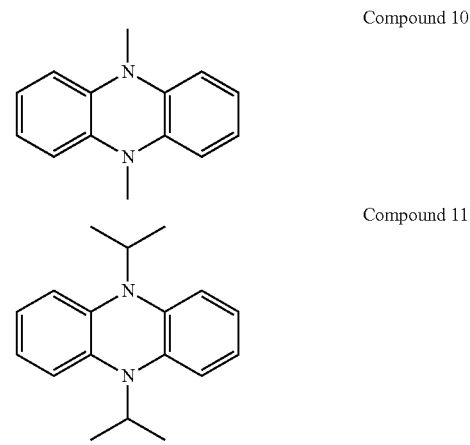

Compound 10

Compound 11

-continued

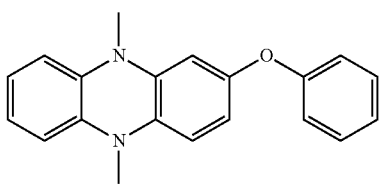

Compound 12

TABLE 4

|  | Compound 10 | Compound 11 | Compound 12 |
|---|---|---|---|
| Oxidation potential [mV] | −240 | −200 | −230 |
| Molecular long axis length [Å] | 9.5 | 9.6 | 13.3 |
| Molecular short axis length [Å] | 6.7 | 9.5 | 6.7 |
| Molecular area [Å$^2$] | 63.7 | 91.2 | 89.1 |

Two kinds of Compounds 10, 11, and 12, or three kinds thereof were mixed, and the absorption spectra of the mixture at respective temperatures of −5° C., 25° C., 50° C., and 80° C. were measured. The measurement method is the same as that of Example 1.

The absolute value of a difference in oxidation potential between respective materials, and a molecular length ratio of (large molecular length)/(small molecular length) and an area ratio of (large area)/(small area) therebetween are shown in Table 5. Whether or not the retention of an absorption spectrum against a temperature change is satisfactory is also represented in three stages (□, ○, and × in order of decreasing satisfactoriness) in Table 5.

Figure 11:
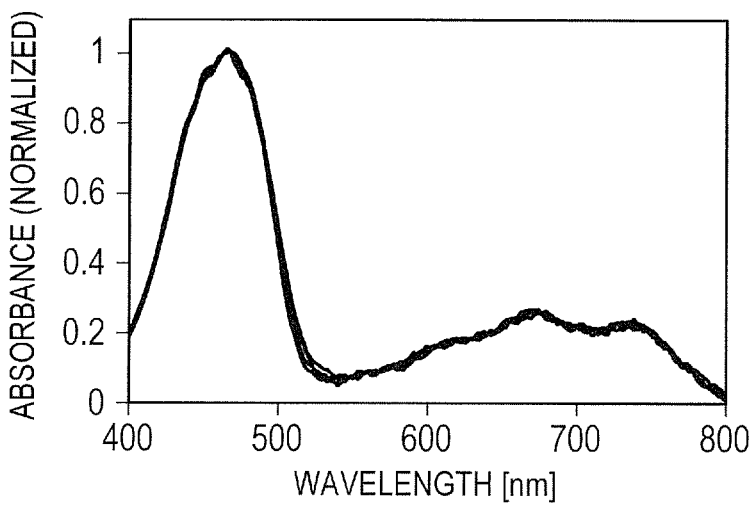
FIG. 11 is a graph obtained by normalizing and superimposing the absorption spectra of an EC element of Example 2 at respective temperatures.

In addition, FIG. 11 is a graph obtained by normalizing and superimposing the absorption spectra of an EC element produced by mixing Compound 10 and Compound 11 at respective temperatures.

TABLE 5

| Organic EC material | | | Absolute value of difference in oxidation potential [mV] | Molecular length ratio (large/small) | Area ratio (large/small) | Whether or not retention of absorption spectrum is satisfactory |
|---|---|---|---|---|---|---|
| Compound 10 | Compound 11 | | 40 | 1.011 | 1.433 | □ |
| Compound 10 | Compound 12 | | 10 | 1.400 | 1.400 | □ |
| Compound 11 | Compound 12 | | 30 | 1.385 | 1.023 | □ |
| Compound 10 | Compound 11 | Compound 12 | 40 | 1.400 | 1.400 | □ |

As can be seen from Table 5, as in Example 1, when the molecular length ratio was 1.4 or less, or the area ratio was 1.5 or less that was less than 2.2, the retention of the absorption spectrum against the temperature change fell within an allowable range. Further, a difference in oxidation potential of 60 mV or less exhibited an additional effect on the retention of the absorption spectrum against the temperature change. As long as organic EC materials satisfying such relationships were mixed, as shown in FIG. 11, the shape of the absorption spectrum was able to be substantially retained even when the temperature changed in the range of from −5° C. to 80° C. In addition, as shown in Table 5, even when the three kinds were mixed, the absorption spectrum was retained against the temperature change. It is also conceivable that as long as the ratio and the absolute value fall within ranges satisfying such relationships, even when three or more kinds are mixed, the absorption spectrum is maintained against the temperature change.

As described above, the temperature characteristics of the anodic materials were able to be uniformized by suitably designing the molecular length ratio, and the difference in oxidation potential, between the materials. It can be assumed that the same holds true for cathodic materials (in this case, a difference in reduction potential is used).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

1: EC element, 2, 6: substrate, 3, 5: electrode, 4: spacer, 7: EC layer, 8: driving power supply, 9: resistance switching device, 10: controller.

The invention claimed is:

1. An electrochromic element, comprising:
a pair of electrodes; and
an electrochromic layer disposed between the pair of electrodes,
wherein:
the electrochromic layer contains at least one of:
two or more anode electrochromic materials, or
two or more cathode electrochromic materials; and
all of the anode electrochromic materials have an equal molecular length, or satisfy a condition that a molecular ratio of (large molecular length)/(small molecular length) is 1.4 or less, or
all of the cathode electrochromic materials have an equal molecular length, or satisfy a condition that a molecular ratio of (large molecular length)/(small molecular length) is 1.4 or less.

2. The electrochromic element according to claim 1, wherein the electrochromic layer contains the two or more anode electrochromic materials, and all absolute values of differences in oxidation potential between the anode electrochromic materials are 60 mV or less.

3. The electrochromic element according to claim 2, wherein all the absolute values of the differences in oxidation potential between the anode electrochromic materials are 20 mV or less.

4. The electrochromic element according to claim 2, wherein the electrochromic layer contains the two or more cathode electrochromic materials, and all absolute values of differences in reduction potential between the cathode electrochromic materials are 60 mV or less.

5. The electrochromic element according to claim 1, wherein the electrochromic layer contains the two or more cathode electrochromic materials, and all absolute values of differences in reduction potential between the cathode electrochromic materials are 60 mV or less.

6. The electrochromic element according to claim 1, wherein the electrochromic layer contains the two or more anode electrochromic materials and the two or more cathode electrochromic materials, and
wherein all of the anode electrochromic materials have the equal molecular length, or satisfy the condition that the molecular ratio of (large molecular length)/(small molecular length) is 1.4 or less, and
all of the cathode electrochromic materials have the equal molecular length, or satisfy the condition that the molecular ratio of (large molecular length)/(small molecular length) is 1.4 or less.

7. The electrochromic element according to claim 1, wherein all of the anode electrochromic materials have the equal molecular length, or satisfy a condition that the molecular ratio of (large molecular length)/(small molecular length) is 1.2 or less, or
all of the cathode electrochromic materials have the equal molecular length, or satisfy a condition that the molecular ratio of (large molecular length)/(small molecular length) is 1.2 or less.

8. The electrochromic element according to claim 1, wherein the electrochromic layer contains the two or more anode electrochromic materials and the two or more cathode electrochromic materials, and
wherein all of the anode electrochromic materials have an equal area that is a product of a molecular long axis and a molecular short axis, or satisfy a condition that an area ratio of (large area)/(small area) is 2.2 or less, and
all of the cathode electrochromic materials have an equal area that is a product of a molecular long axis and a molecular short axis, or satisfy a condition that an area ratio of (large area)/(small area) is 2.2 or less.

9. The electrochromic element according to claim 8, wherein all of the anode electrochromic materials have the equal area that is the product of the molecular long axis and the molecular short axis, or satisfy a condition that the area ratio of (large area)/(small area) is 1.3 or less, and
all of the cathode electrochromic materials have the equal area that is the product of the molecular long axis and the molecular short axis, or satisfy a condition that the area ratio of (large area)/(small area) is 1.3 or less.

10. An electrochromic apparatus, comprising:
the electrochromic element of claim 1; and
a drive unit configured to drive the electrochromic element.

11. The electrochromic apparatus according to claim 10, wherein the drive unit comprises a unit configured to control a transmittance of the electrochromic element by pulse width modulation, the unit being configured to maintain the transmittance of the electrochromic element without changing a wave height value of a pulse voltage waveform, and to control the transmittance of the electrochromic element by changing a ratio of an application period of an applied voltage to one cycle of the pulse voltage waveform.

12. An optical filter, comprising the electrochromic element of claim 1.

13. An imaging apparatus, comprising:
the optical filter of claim 12; and
a light-receiving element configured to receive light that passed the optical filter.

14. A window member, comprising the electrochromic element of claim 1.

15. An electrochromic element, comprising:
a pair of electrodes; and
an electrochromic layer disposed between the pair of electrodes,
wherein:
the electrochromic layer contains at least one of:
two or more anode electrochromic materials, or
two or more cathode electrochromic materials; and
all of the anode electrochromic materials have an equal area that is a product of a molecular long axis and a molecular short axis, or satisfy a condition that an area ratio of (large area)/(small area) is 2.2 or less, or
all of the cathode electrochromic materials have an equal area that is a product of a molecular long axis and a molecular short axis, or satisfy a condition that an area ratio of (large area)/(small area) is 2.2 or less.

16. The electrochromic element according to claim 15, wherein all of the anode electrochromic materials have the equal area that is the product of the molecular long axis and the molecular short axis, or satisfy a condition that the area ratio of (large area)/(small area) is 1.3 or less and
all of the cathode electrochromic materials have the equal area that is the product of a molecular long axis and a molecular short axis, or satisfy a condition that the area ratio of (large area)/(small area) is 1.3 or less.

17. An electrochromic apparatus, comprising:
the electrochromic element of claim 15; and
a drive unit configured to drive the electrochromic element.

18. An optical filter, comprising the electrochromic element of claim 15.

19. An imaging apparatus, comprising:
the optical filter of claim 18; and
a light-receiving element configured to receive light that passed the optical filter.

20. A window member, comprising the electrochromic element of claim 15.

* * * * *